(12) United States Patent
Davis et al.

(10) Patent No.: US 8,023,716 B2
(45) Date of Patent: Sep. 20, 2011

(54) SYNCHRONIZATION OF IMAGE CAPTURE SETTINGS

(75) Inventors: Margaret A. Davis, Dallas, TX (US); Mark A. Redline, Malden, MA (US)

(73) Assignee: Bank of America Corporation, Charlotte, NC (US)

( * ) Notice: Subject to any disclaimer, the term of this patent is extended or adjusted under 35 U.S.C. 154(b) by 887 days.

(21) Appl. No.: 11/925,277

(22) Filed: Oct. 26, 2007

(65) Prior Publication Data
US 2009/0109494 A1 Apr. 30, 2009

(51) Int. Cl.
*G06K 9/00* (2006.01)
*H04N 1/04* (2006.01)

(52) U.S. Cl. .................... 382/137; 382/306; 358/474

(58) Field of Classification Search .............. 382/100, 382/101, 102, 112–116, 135–141, 155, 156, 382/168, 170, 173, 176, 179, 181–189, 209–224, 382/232, 254, 274, 276, 286, 292, 305, 312, 382/321, 306; 715/247, 708; 726/32; 358/474; 235/379
See application file for complete search history.

(56) References Cited

U.S. PATENT DOCUMENTS

| | | | | |
|---|---|---|---|---|
| 6,351,815 B1 * | 2/2002 | Adams | ............................ | 726/32 |
| 6,427,032 B1 * | 7/2002 | Irons et al. | .................... | 382/306 |
| 6,751,780 B1 * | 6/2004 | Neff et al. | ...................... | 715/247 |
| 7,353,988 B1 * | 4/2008 | Ramachandran | ............. | 235/379 |
| 7,831,912 B2 * | 11/2010 | King et al. | .................... | 715/708 |
| 2002/0154343 A1 * | 10/2002 | Chiu et al. | .................... | 358/474 |

FOREIGN PATENT DOCUMENTS
WO 0173679 * 10/2001

OTHER PUBLICATIONS
International Search Report and Written Opinion for PCT/US2008/081097 dated Jan. 22, 2009.
Whitney, "A Direct Method of Nonparametric Measurement Selection", IEEE Transactions on Computers, IEEE Service Center, Sep. 1, 1971, pp. 1100-1103.

* cited by examiner

*Primary Examiner* — Seyed Azarian
(74) *Attorney, Agent, or Firm* — Banner & Witcoff, Ltd.; Michael Springs

(57) ABSTRACT

A tool may be provided that may allow a first party (e.g., a sending bank) to synchronize its image scan settings with unknown image assessment standards of a second party (e.g., a recipient bank). However, such a tool may be used within a single party that performs both scanning and image assessment, and is not limited for use between two or more parties.

16 Claims, 4 Drawing Sheets

Fig. 4
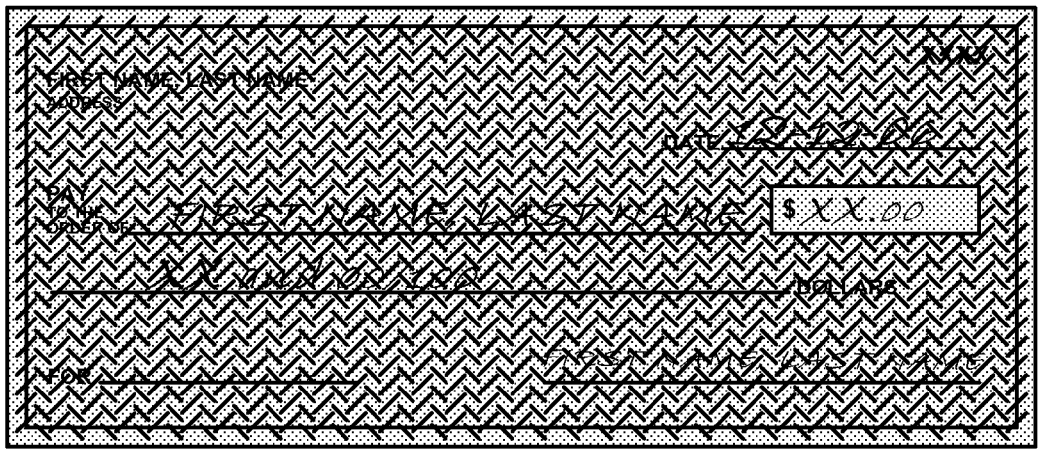
Fig. 5
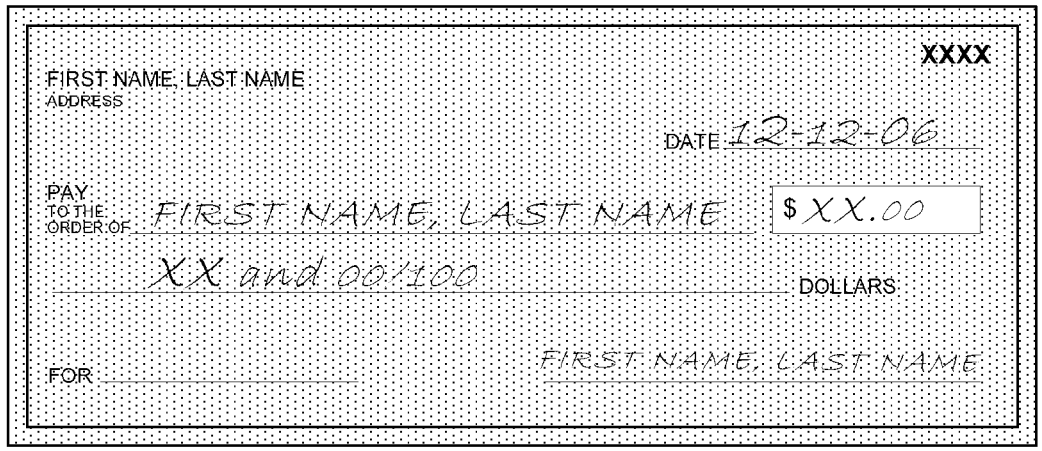
Fig. 6

SYNCHRONIZATION OF IMAGE CAPTURE SETTINGS

BACKGROUND

With the implementation of the Check Clearing for the 21st Century Act (also known as Check 21) in 2004, financial institutions such as banks are now able to exchange check images to settle cash letters, rather than sending the paper checks for settlement. Check 21 has generally allowed financial institutions to realize significant savings in the time required to settle cash letters.

Under Check 21, a bank of first deposit (BOFD) or other sending bank uses Image Exchange to send check images to another recipient bank under the ANSI X.937 standard. The recipient bank, which may be a private bank or one of the Federal Reserve branches, conducts a quality assessment using specialized image quality software. If an image does not meet the recipient bank's image quality standards, the image is rejected and returned to the sending bank unpaid. These rejected images are sometimes referred to as administrative returns or non-conforming images. A rejected image typically requires the sending bank to physically locate the original paper check, re-encode the magnetic ink character recognition (MICR) line of the paper check, and re-process the paper check. This process takes a certain amount of time per check, which is undesirable. Even if only a very small percentage of images (e.g., one percent) are non-conforming, the handling of non-conforming images can nevertheless add significant risk and cost on the part of the sending bank where very large numbers of checks are processed every day, as is typical.

Although image quality assessment tools are commercially available, financial institutions have not been able to easily diagnose and resolve the root causes of the chronic image quality issues that are causing trading partners to reject the images. This problem is complicated by the fact that image quality standards typically vary from bank to bank and are often not known. This is because most banks purchase commercially available image assessment software from a third party provider, and most third party providers are not apt to disclose information about their proprietary image analysis algorithms, leaving the sending banks to simply guess how the software of each recipient banks assesses check images.

Moreover, even though existing check scanning equipment provides for adjustment of scan settings, there is a tremendous variability in the quality of the source checks involved. The adjustability of scan settings is meant to adjust for this variability. However, scan setting adjustment cannot be adjusted for each individual check—millions of checks are often scanned every day.

SUMMARY

There is therefore a need to reduce the incidence of non-conforming check images in the check clearing process, or of non-conforming images of any other type of document in other processes. There is also a need to find a static combination of scan settings that for a given process will reduce or even minimize the incidence of the non-conforming images. The particular combination of settings may depend upon the scanner itself, the type of document being scanned, the image quality standards being implemented, and the variability of document quality in the document population being processed, among other possible factors. To accomplish this, a tool may be provided that may allow a first party (e.g., a sending bank) to synchronize its image scan settings with unknown image assessment standards of a second party (e.g., a recipient bank). However, such a tool may be used within a single party that performs both scanning and image assessment, and is not limited for use between two or more parties.

For example, some aspects as described herein are directed to, for example, methods, apparatuses, and software for performing various functions, such as performing a plurality of document scans each using a different scan setting, to generate image data representing a plurality of images; for each of the images, receiving feedback information; determining a scan setting based on the feedback information and the scan settings used for the plurality of images; and performing an additional document scan using the determined scan setting.

These and other aspects of the disclosure will be apparent upon consideration of the following detailed description of illustrative aspects.

BRIEF DESCRIPTION OF THE DRAWINGS

A more complete understanding of the present disclosure may be acquired by referring to the following description in consideration of the accompanying drawings, in which like reference numbers indicate like features, and wherein:

FIGS. 4-6 are various examples of scanned images using different scan settings.

DETAILED DESCRIPTION

The various aspects summarized previously may be embodied in various forms. The following description shows by way of illustration various examples in which the aspects may be practiced. It is understood that other examples may be utilized, and that structural and functional modifications may be made, without departing from the scope of the present disclosure.

Except where explicitly stated otherwise, all references herein to two or more elements being "coupled," "connected," and "interconnected" to each other is intended to broadly include both (a) the elements being directly connected to each other, or otherwise in direct communication with each other, without any intervening elements, as well as (b) the elements being indirectly connected to each other, or otherwise in indirect communication with each other, with one or more intervening elements.

Although many of the examples herein are described in the context of check images, the various aspects may be used in any imaging context, such as in the imaging of any type of document.

Figure 1:
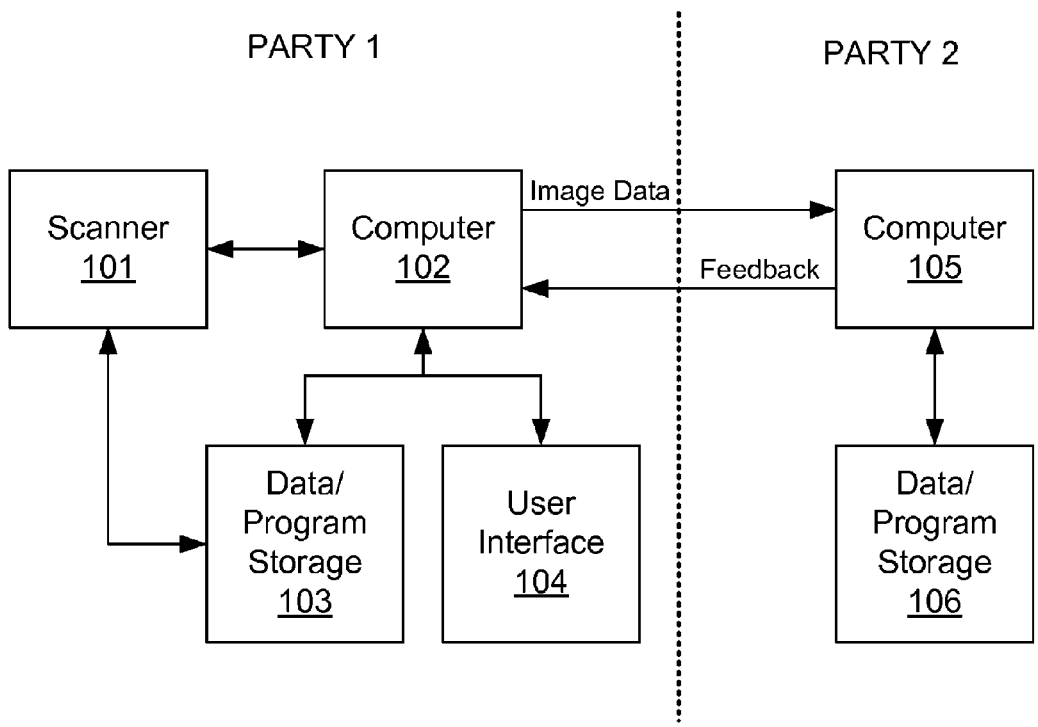
FIG. 1 is a functional block diagram of an illustrative system for synchronizing image scan settings.

Referring to FIG. 1, an illustrative system is shown that may be used for synchronizing image scan settings. The system of FIG. 1 is distributed among a first party and a second party, which may or may not be geographically and/or physically separate from each other. The first party as shown as a scanner 101, a computer 102, data/program storage 103, and a user interface 104. The second party as shown has a computer 105 and data/program storage 106. Any or all of these elements in FIG. 1 may be distributed in other ways and/or all located at a single one of the parties. Moreover, because FIG. 1 indicates functional blocks, any of the various functional blocks may or may not be physically embodied as separate units. For example, where only a single party is involved, computers 102 and 105 may be the same computer or separate computers and/or storage 103 and 106 may be embodied as the same storage. Also, for example, scanner 101, storage 103, and/or user interface 104 may be physically part of computer 102 or separate therefrom. Likewise, storage 106 may be physically part of or separate from computer 105. In addition, other elements may be included, such as a user interface for computer 105, as desired.

Scanner 101 may be configured to scan paper documents, such as checks or other financial documents, photographs, textual documents, medical records, and/or any other types of documents. For example, scanner 101 may be, or be part of, a commercially available check processing apparatus such as an IBM 3890 high speed document processor that is typically used by many banks at the present time.

Computer 102 may be any type of computing device or combination of multiple computing devices, such as a desktop computer, a laptop computer, a handheld computer, a server, a mainframe, and/or a central processing unit (CPU) or other processor. Computer 102 may be programmable by executing computer-executable instructions (such as in the form of software). These computer-executable instructions may be stored on a computer-readable medium, which may be, or be part of, storage 103. Any or all of the functions performed by computer 102 referred to herein may be performed in accordance with the execution of the appropriate computer-executable instructions stored in storage 103. Additionally or alternatively, storage 103 may store data on a computer-readable medium so as to be accessible to computer 102.

Likewise, computer 105 may be any type of computing device of combination thereof, and storage 106 may include a computer-readable medium for storing computer-executable instructions to be executed by computer 105 and/or data accessible to computer 105. Any or all of the functions performed by computer 105 referred to herein may be performed in accordance with the execution of the appropriate computer-executable instructions stored in storage 106.

A computer-readable medium as used herein is any type of device and/or material, or combination of devices and/or materials, capable of storing information in a form readable by machine. For example, a computer-readable medium may be one or more optical disks (such as compact disks, or CDs; or such as optical drives), one or more magnetic disks (such as floppy disks or magnetic hard drives), one or more magnetic tapes, and/or one or more memory chips.

User interface 104 may be any type of device that allows a user to input information into computer 102 and/or receive information output from computer 102. For example, user interface 104 may include one or more video screens, one or more printers, one or more keyboards, one or more mice, joysticks, or other cursor navigation controls, one or more touch-sensitive or stylus-sensitive input pads (which may be integrated with a video screen), one or more audio microphones, and/or one or more audio speakers.

In operation, paper checks or other documents may be scanned by scanner 101, to produce data representing images of the paper documents. This data is forwarded to computer 102 and/or storage 103. Computer 102 may receive this data from scanner 101 and/or from storage 103, and may package and forward the data (now referred to as image data in this example) to computer 105 for image assessment. Where computers 102 and 105 are physically separate computers, they may be directly or indirectly coupled together. Where they are indirectly coupled, they may be coupled via a network, which may include, for example, the Internet, a local area network (LAN), and/or an intranet. Where computers 102 and 105 communicate with each other (either directly or via a network), each of the computers may include a communication interface, such as a network card.

Computer 105 may store the received image data in storage 106 and may perform image assessment, such as in accordance with computer-executable instructions stored in storage 106. As a result of the image assessment, computer 105 may provide feedback to computer 102 (such as via the network mentioned above), indicating a result of the image assessment. For example, the feedback may be in the form of data and include a simple pass/fail result and/or one or more reasons for the pass/fail result.

Figure 2:
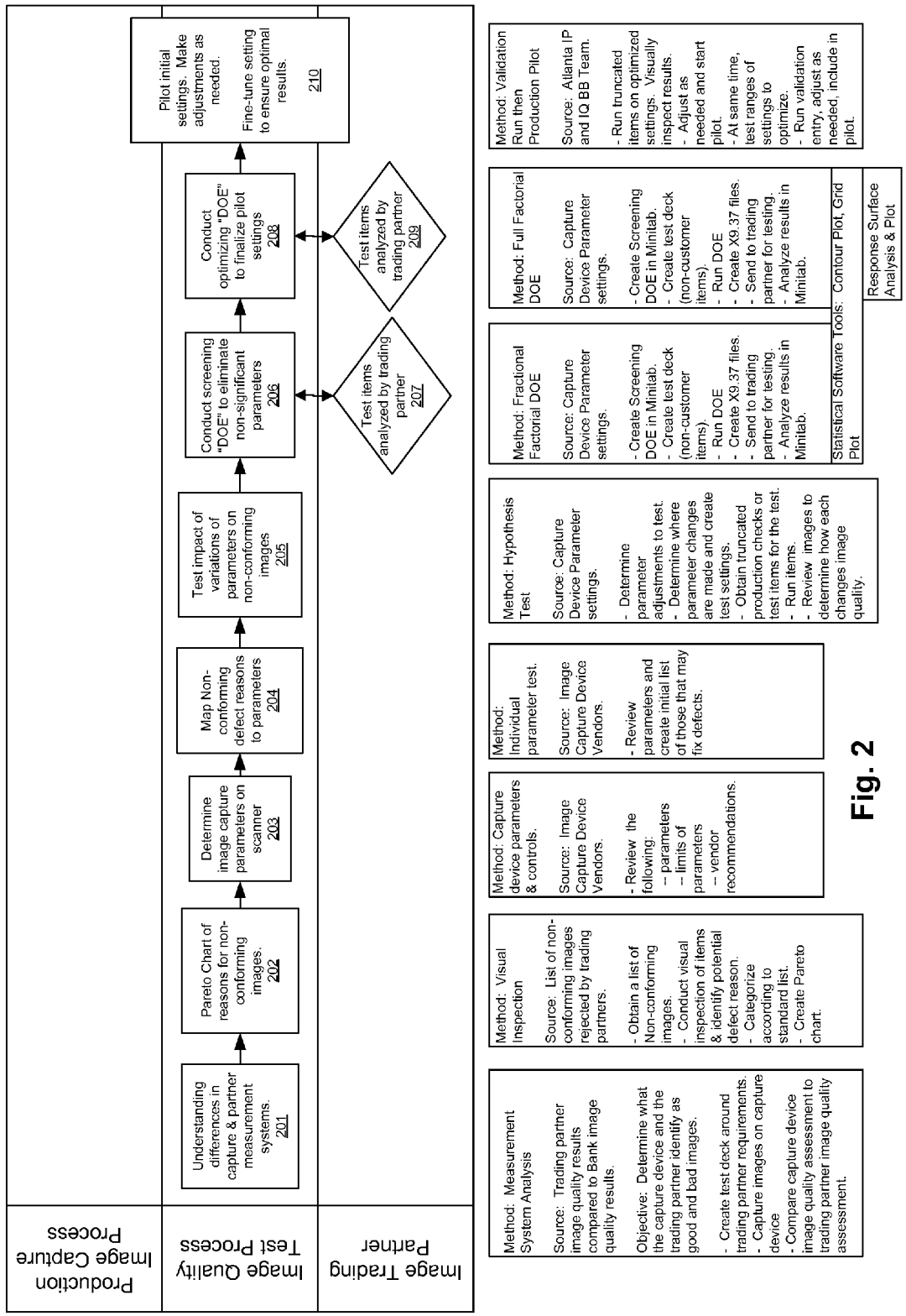
FIG. 2 is a flow chart showing illustrative steps in a method that may be performed by the system of FIG. 1.

An illustrative method that may be performed by the system of FIG. 1 will now be described with reference to FIG. 2. As can be seen, the various steps may be performed by multiple different parties, such as two different parties (e.g., two different banks). However, all steps may alternatively be performed by the same party. In the present example of FIG. 2, the first party (of FIG. 1) is a bank and the second party (of FIG. 2) is a trading partner of the bank. In the method of FIG. 2, settings for one or more scan setting parameters may be ultimately determined that may improve the chances that a given image will pass an image assessment standard, even where that standard is unknown. Scan setting parameters are parameters that affect the scanned image. These scan setting parameters may be chosen, for example, at scanner 101 and/or computer 102. Examples of scan setting parameters may include gamma, brightness, darkness, bias, white reference, black reference, scan speed, image resolution, image size, image shape, image orientation, and color depth. Other scan setting parameters may also be chosen, and may depend upon the scan setting parameters available to be set at or by scanner 101 and/or computer 102. The IBM 3890 high speed document processor, for example, provides 22 different scan setting parameters. Blind guessing to find the correct values of the scan setting parameters would be quite unlikely to result in success where such a large number of potentially important scan setting parameters are available. For instance, where 22 scan setting parameters are provided, and assuming each parameter has only eight possible values (e.g., in the range of 0 to 7) or the user is interested in only a subset of eight different values for each parameter, there are already more than seventy-three quintillion parameter value combinations. Clearly, a more intelligent and ordered analysis and testing process is needed.

Before beginning such an analysis and testing, it may be desirable to understand how the bank's image capture system judges the images it creates compared to how the trading partner's image system will judge those same images (step 201), by testing a wide variety of different test documents. Ideally, it is desirable that there is a strong correlation between the trading partner's image assessment and the bank's own image assessment. A high correlation will make the remainder of this process more effective, and means that the pass/fail image quality analysis between the bank and the trading partner are reasonably synchronized. In fact, it may be decided that in order to proceed with further steps, at least a threshold amount of correspondence between image quality assessments made by the bank and made by the trading partner must exist. For example, that threshold amount may be a 70% correlation (i.e., at least 70% of the image quality judgments must be the same). If the percent of commonality in judgments is less than the threshold, it may be decided that the measurement system should be fixed before proceeding.

This test on a variety of different test documents may be conducted with an initial combination of scan setting parameter values. The initial combination may be the combination of values that is currently being used by the bank, or a default set of scan settings provided by scanner 101 or the manufacturer of scanner 101, or even any arbitrary initial group of values, such as a medium value for each parameter. The test documents may be selected so as to be a representative sample of those documents currently captured (or expected to be captured) in production.

Once the measurement system is validated, a sub-set of the entire population may be analyzed. This subset may be, for instance, a representative sample of the images rejected by trading partners. A sampling of these images may be visually inspected by humans. Based on the visual inspection, the images may be placed in various logical categories identifying certain problems with the images. For example, based on the visual inspection, it may be determined that some of the images look too dark to read, or a clearly too light, or show a significant amount of herringbone or other background pattern.

Based upon the categorization, in step 202 a Pareto chart may be created to show which categories (i.e., which image defects) are the most prevalent and which are to be included in the scope of testing from this point onward.

Using the Pareto chart and the defects identified as being "in scope" for the study, a range of scan settings may be determined in step 203. Those scan settings that match the defect types that were identified in step 202 may be identified.

Using a test set of documents to be scanned (for example, 100 different documents), tests may be conducted in step 204 to determine what each of the scan setting parameters in step 203 actually do to the images. In this test (unlike those to follow), only one parameter is changed at a time. This may be used as a learning step to understand the scan setting parameters. The parameters tested here will move on to step 205 of the process.

Next in the process, in step 205, N>1 scans are performed on a document in order to test the impact of variations of scan setting parameter values on non-conforming images used or found in the previous steps. Each scan may use a different combination of settings of the chosen scan setting parameters. The various scans may be of the same document or of different documents. However, scanning the same document using different scan settings may produce a more accurate result.

For instance, Table 1 below shows an example of scan settings that may be used to perform the various scans in step 205. In this example, it is assumed that scan setting parameters A and B each have a possible range of 0 through 255, scan setting parameter C has a possible range of 0 through 10, and scan setting parameter D has a possible range of 0.5 to 3.0. These possible ranges of scan settings may differ depending upon the particular system used.

TABLE 1

| Scan # | Parameter A | Parameter B | Parameter C | Parameter D |
| --- | --- | --- | --- | --- |
| 1 | 25 | 25 | 1 | 0.7 |
| 2 | 25 | 100 | 1 | 0.7 |
| 3 | 25 | 200 | 1 | 0.7 |
| 4 | 100 | 25 | 1 | 0.7 |
| 5 | 100 | 100 | 1 | 0.7 |
| 6 | 100 | 200 | 1 | 0.7 |
| ... | ... | ... | ... | ... |
| ... | ... | ... | ... | ... |

TABLE 1-continued

| Scan # | Parameter A | Parameter B | Parameter C | Parameter D |
| --- | --- | --- | --- | --- |
| N − 2 | 200 | 200 | 4 | 2.5 |
| N − 1 | 200 | 200 | 8 | 1.0 |
| N | 200 | 200 | 8 | 2.5 |

Figure 3:
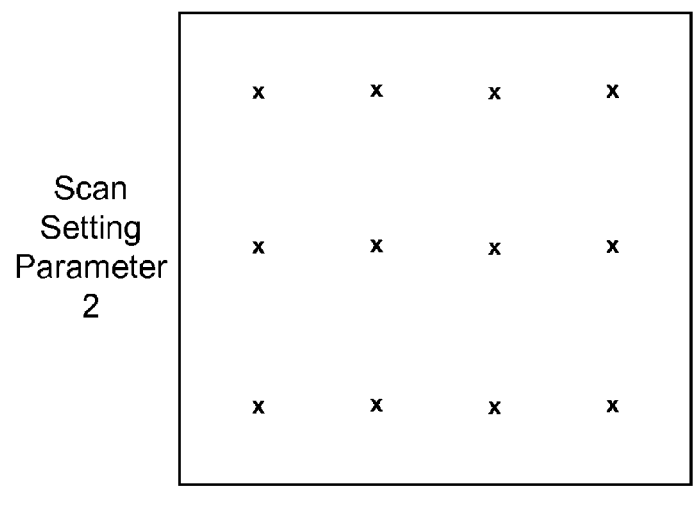
FIG. 3 is a graph showing illustrative scan setting combinations.

The actual settings of each scan setting parameter used in step 205 may be chosen in any way desired. However, it may be beneficial to choose combinations of scan settings that cover a broad range of possible combinations. With a greater variety of scans collected in step 205, a greater amount of data is collected. This may mean that a more accurate final set of scan settings may be determined. For example, assuming that M scan setting parameters are chosen in step 204, it may be desirable to distribute the various scan setting parameter value combinations somewhat evenly throughout an M-dimensional space (where each scan setting parameter is a separate dimension) or a portion thereof. For instance, where only two scan setting parameters are chosen (M=2), then it may be desirable to choose scan setting combinations such as shown in FIG. 3, where each "x" indicates a scan setting combination used in one of the scans in step 205. However, any scan setting combination distribution may be chosen.

The multiple scans in step 205 may be handled manually and/or automatically at scanner 101. Where the scanning is at least partially automated, scanning may be governed by scanner 101 and/or by computer 102. The user may enter desired scan settings into user interface 104, and/or the desired scan settings may be stored as data in storage 103. The images resulting from the scans may be also stored by computer 103 and/or by scanner 101 in storage 103.

In step 206, fractional factorial Design of Experiments (DOE) techniques may be used to eliminate non-significant scan setting parameters. In other words, we are trying to find the critical few scan setting parameters that make the most difference to image quality. Statistical and/or DOE software tools such as Minitab or SAS may be used for this and other steps.

At step 207, the multiple images from the image scans of step 205 are sent to the second party (where there is one), in this example the trading partner, who analyzes/assesses the images from the various scans, and generates feedback for some or all of the images. This analysis and feedback generation may be performed by computer 105. The feedback may be explicit or may be implicit in that no feedback is provided for some images. For example, silence (i.e., no feedback) for a given image may by default mean a pass or fail, as desired. Where computer 105 is separate from computer 102, computer 102 may retrieve the stored image data and forward it to computer 105, either directly or via a network. The network may include, for example, the Internet, a local area network (LAN), and/or an intranet. Alternatively, the image data may be stored from computer 102 onto a portable computer-readable medium (such as a compact disk), which would then be physically provided to computer 105.

As previously mentioned, the feedback may include a pass or fail indication. The feedback may further include one or more reasons associated with the pass/fail indication, especially where the indication is of a failure. For example, the feedback may indicate that a particular image failed, and that a reason it failed was that it was too light (see, e.g., FIG. 6), or too dark (seek, e.g., FIG. 5). Other reasons may include certain patterns or other features in the image that are undesirable. For example, it is common for a check to have a background pattern such as a herringbone pattern. It may be that the reason may indicate that the background pattern is too visible (see, e.g., FIGS. 4 and 5), thereby potentially hiding other information on the check. Other reasons for failure may include, for example, mis-orientation of the document or a portion of the document being missing (e.g., a corner is torn off or folded).

Where computers 102 and 105 are the same, then the feedback may simply be internally generated data, such as between two software applications. Where computers 102 and 105 are separate, then the feedback may be sent as data back to computer 102 directly, via the network, or through a portable delivered computer-readable medium as described previously. Alternatively, the feedback may be provided in human-readable format (e.g., a written paper letter or an email) and/or provided verbally such as via telephone.

Figure 7:
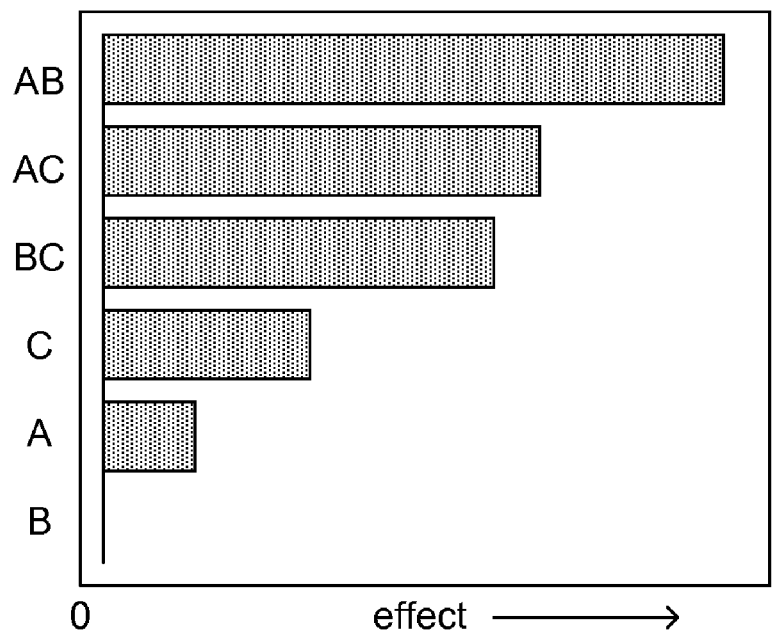
FIG. 7 is an illustrative Pareto chart that may be generated in connection with performing the method of FIG. 2.

Computer 102 and/or the user may use the feedback, as well as the knowledge of which images were scanned using which scan settings, to choose a subset of the scan setting parameters. This may be done in any number of ways. For example, a DOE approach may be implemented using computer 102, such as creating a Pareto chart like the one shown in FIG. 7, which shows the effect of changing various scan setting parameters and/or combinations of scan setting parameters. This Pareto chart or any other charts or statistical analysis results may be displayed or otherwise presented to the user via user interface 104. In the example of FIG. 7, the Pareto chart shows the relative effect on image passage/failure for scan setting parameters A, B, and C, as well as for combinations of scan setting parameters A+B, A+C, and B+C. As can be seen in this example, this Pareto chart indicates that changing individual scan setting parameters do not have as much effect as changing combinations of scan setting parameters A+B, A+C, and B+C. However, depending upon the system used, results may vary. Scan setting parameters A, B, and C in FIG. 7 may be any full set or subset of the originally chosen scan setting parameters, such as gamma, brightness, darkness, bias, white reference, black reference, scan speed, image resolution, image size, image shape, image orientation, and color depth. Other scan setting parameters are possible.

In choosing a subset of the original set of chosen scan setting parameters, computer 102 and/or the user may rank in order the scan setting parameters and/or various combinations of the scan setting parameters, such as in accordance with their relative effects on the passage/failure of images. In the example of FIG. 7, it may be therefore decided that combination A+B is ranked the highest because changes in this combination of scan setting parameters has the most effect on the passage/failure of an image, then combination A+C, then combination B+C, then C, then A, and then finally B because changes in scan setting parameter B has the least effect on the passage/failure of an image. The user and/or computer 102 may then select the subset, for instance, by choosing only the higher ranked scan setting parameters and/or combinations of scan setting parameters. For example, based on the results shown in FIG. 7, the parameter combinations A+B, A+C, and B+C may be chosen, discarding the individual parameters A, B, and C.

Referring again to FIG. 2, in step 208, scanner 101 is again used to scan one or more documents multiple times using different scan setting combinations. Again, scanning may be controlled by scanner 101 alone, may be manually controlled by a user, and/or may be controlled by computer 102. In this case, those scan setting parameters not chosen in the subset may be set at constant values, and those scan setting parameters (and/or combinations thereof) within the chosen subset may be varied in a similar manner as in step 202. Image data for these scans is collected and sent to computer 105 (similar to step 202) for analysis. In step 209, feedback for each of the images is again provided in the same manner as step 203, and this feedback is provided back to computer 102, again in the same manner as step 203.

Figure 8:
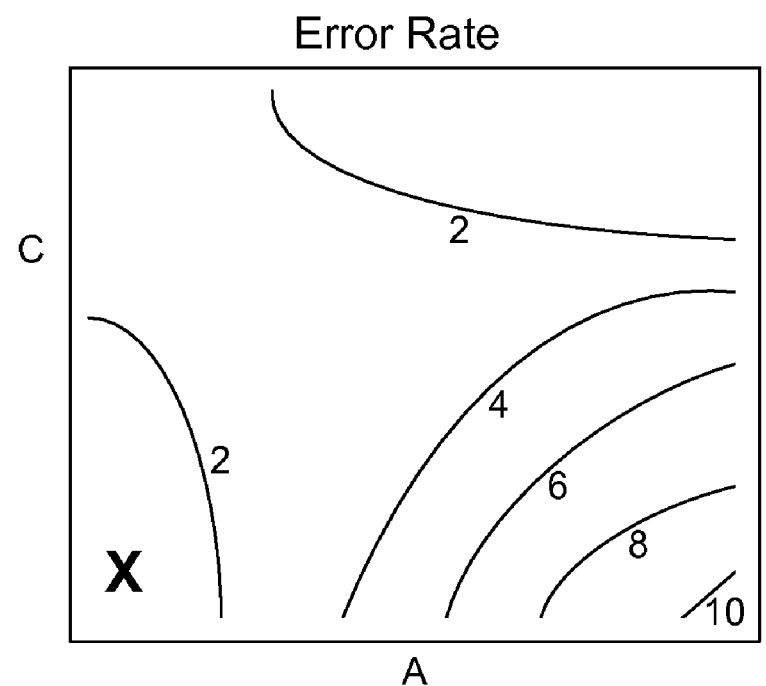
FIG. 8 is an illustrative contour graph that may be generated in connection with performing the method of FIG. 2.

The user and/or computer 102 then chooses final scan setting parameter values based on the feedback received and generated in step 209. In doing so, statistical analysis may again be performed. For example, FIG. 8 shows a contour graph of the error rate (e.g., the number of failures per Z images, where Z may equal, for instance, 100) depending upon the values of scan setting parameters A and C (because the combination A+C was included in the subset of chosen parameters). Similar graphs may be made of other parameter combinations in the chosen subset. In the particular example of FIG. 8, an "X" is placed in a region having a particularly low error rate, in this case less than 2. By doing the same analysis with other parameter combinations, either one at a time or in parallel, scan setting parameter values may be chosen that may reduce the total error rate. Finally, in step 210, the determined values of the scan setting parameters may be implemented in production. Any scan setting parameters eliminated as not being significant may be set to an arbitrary value, such as a medium value.

Any results of the statistical analysis in steps 204 and 207 may be output to the user by computer 102 via user interface 104. For example, the graphs in FIGS. 7 and 8 may be displayed to the user on a video display and/or printed on paper.

In this way, a set of scan setting parameter values may be determined that may result in a relatively high image pass rate based on an image assessment algorithm that is not necessarily known. These parameter values may be determined iteratively and analytically based on a series of test scans and their respective image assessment results. Once these final parameter values are chosen, they may then be used for future scans of documents, especially of documents that are of the same type as those used for the testing phase.

It is noted that the final parameter values may depend on the type of document being scanned. For example, if checks are used as test scan documents in the method of FIG. 2, then the final chosen parameter values may be appropriate for future check scans. However, those parameter values may not be appropriate for a different type of document, in which case the method of FIG. 2 may be performed separately for the other type of document. Likewise, if various scanned documents are to be sent to different recipients, then different scan setting values may be determined for each recipient. However, it may be desirable to determine a "lowest common denominator" of the scan setting parameter values amongst the various recipients so that a certain chosen set of parameter values provides good results for all of the recipient population.

The invention claimed is:

1. A method, comprising:
    performing a plurality of scans of a plurality of different documents each using a different scan setting, to generate image data representing a plurality of images;
    for each of at least a subset of the images, receiving feedback information;
    determining, by a computer, a scan setting based on the feedback information and the scan settings used for the plurality of images; and
    performing an additional document scan using the determined scan setting,
    wherein the different scan settings and the determined scan setting each comprises a plurality of scan setting types, and wherein determining further comprises ranking, the plurality of scan setting types based on the feedback information.

2. The method of claim 1, wherein the feedback information for each of the images comprises an indication of a pass status versus a fail status.

3. The method of claim 1, wherein determining further comprises choosing a subset of the plurality of scan setting types based on the feedback information.

4. The method of claim 1, further comprising sending the image data to a network, wherein receiving comprises receiving the feedback information from the network.

5. The method of claim 4, wherein the network comprises the Internet.

6. A non-transitory computer-readable medium storing computer-executable instructions for performing a method, the method comprising:
  performing a plurality of document scans of a plurality of different documents each using a different scan setting, to generate image data representing a plurality of images;
  determining a scan setting based on received feedback information and the scan settings used for the plurality of images, wherein the feedback information is based on the image data;
  and performing an additional document scan using the determined scan setting,
  wherein the different scan settings and the determined scan setting each comprises a plurality of scan setting types, and wherein determining further comprises ranking the plurality of scan setting types based on the feedback information.

7. The non-transitory computer-readable medium of claim 6, wherein the feedback information for each of the images comprises an indication of a pass status versus a fail status.

8. The non-transitory computer-readable medium of claim 6, wherein determining further comprises choosing a subset of the plurality of scan setting types based on the feedback information.

9. The non-transitory computer-readable medium of claim 6, further comprising: sending the image data to a network; and receiving the feedback information from the network.

10. The non-transitory computer-readable medium of claim 9, wherein the network comprises the Internet.

11. An apparatus, comprising:
  a scanner configured to scan a plurality of different documents each using a different scan setting; and
  a computer configured to receive an output from the scanner and to generate image data representing a plurality of images, to determine a scan setting based on the feedback information and the scan settings used for the plurality of images, wherein the feedback information is based on the image data,
  wherein the different scan settings and the determined scan setting each comprises a plurality of scan setting types, and wherein the computer is further configured to rank the plurality of scan setting types based on the feedback information.

12. The apparatus of claim 11, wherein the computer is configured to communicate with a network, to send the image data to the network, and to receive the feedback information from the network.

13. The apparatus of claim 12, wherein the network comprises the Internet.

14. The apparatus of claim 11, wherein the feedback information for each of the images comprises an indication of a pass status versus a fail status.

15. The apparatus of claim 11, wherein the computer is further configured to choose a subset of the plurality of scan setting types based on the feedback information.

16. An apparatus, comprising:
  means for performing a plurality of scans of a plurality of different documents each using a different scan setting, to generate image data representing a plurality of images;
  means for receiving feedback information for each of at least a subset of the images;
  means for determining a scan setting based on the feedback information and the scan settings used for the plurality of images; and
  means for performing an additional document scan using the determined scan setting,
  wherein the different scan settings and the determined scan setting each comprises a plurality of scan setting types, and wherein the means for determining is further for ranking the plurality of scan setting types based on the feedback information.

* * * * *